United States Patent
Hung et al.

(10) Patent No.: US 11,424,092 B2
(45) Date of Patent: Aug. 23, 2022

(54) ROLLING ELEMENTS-BASED PIVOTING SUPPORTS FOR KEYBOARDS

(71) Applicant: Hewlett-Packard Development Company, L.P., Spring, TX (US)

(72) Inventors: Chih-Chen Hung, Taipei (TW); Hung-Ming Chen, Taipei (TW); Kun-Chih Wang, Spring, TX (US); Ke-Jian Liou, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,365

(22) PCT Filed: Dec. 12, 2018

(86) PCT No.: PCT/US2018/065058
§ 371 (c)(1),
(2) Date: Nov. 2, 2020

(87) PCT Pub. No.: WO2020/122887
PCT Pub. Date: Jun. 18, 2020

(65) Prior Publication Data
US 2021/0366672 A1    Nov. 25, 2021

(51) Int. Cl.
*H01H 13/20* (2006.01)
*G06F 3/02* (2006.01)
*H01H 13/10* (2006.01)

(52) U.S. Cl.
CPC ........... *H01H 13/20* (2013.01); *G06F 3/0202* (2013.01); *H01H 13/10* (2013.01)

(58) Field of Classification Search
CPC .. H01H 13/20; H01H 13/10; H01H 2221/062; H01H 3/125; G06F 3/0202; G06F 3/0238
See application file for complete search history.

(56) References Cited

U.S. PATENT DOCUMENTS

| | | |
|---|---|---|
| 5,799,772 A | 9/1998 | Sanda et al. |
| 6,068,416 A | 5/2000 | Kumamoto et al. |
| 6,772,478 B2 | 8/2004 | Herder et al. |
| 8,118,490 B2 | 2/2012 | Jurja |
| 8,136,778 B2 | 3/2012 | Wagenhoffer, Jr. |
| 8,439,319 B2 | 5/2013 | Page |
| 9,532,646 B2 | 1/2017 | Sears |
| 9,599,153 B2 | 3/2017 | Aldrich |
| 9,690,327 B2 | 6/2017 | Kielland |
| 2011/0119883 A1 | 5/2011 | Gimelshtein et al. |
| 2012/0048701 A1* | 3/2012 | Liu .............. H01H 3/125 200/344 |
| 2014/0138225 A1 | 5/2014 | Yamada |
| 2014/0151212 A1* | 6/2014 | Chang .............. H03K 17/975 200/5 A |
| 2018/0308647 A1 | 10/2018 | Liu |
| 2018/0350537 A1* | 12/2018 | Liao .............. H01H 13/85 |

(Continued)

*Primary Examiner* — Amit Chatly
(74) *Attorney, Agent, or Firm* — HPI Patent Department (57) ABSTRACT

In one example, a keyboard device may include a base plate, a pivoting support fixedly disposed on the base plate and having a recess portion, a key cap support having a shaft portion rotatably received in the recess portion, a rolling element disposed between the shaft portion and the pivoting support, and a key cap assembled to the key cap support.

15 Claims, 7 Drawing Sheets

(56) References Cited

U.S. PATENT DOCUMENTS

2019/0354142 A1* 11/2019 Chen .................... G06F 3/0202
2020/0027671 A1* 1/2020 Fu .......................... H01H 13/14
2020/0090884 A1* 3/2020 Chang ................. H03K 17/967

* cited by examiner

ROLLING ELEMENTS-BASED PIVOTING SUPPORTS FOR KEYBOARDS

BACKGROUND

Keyboards may be used in various devices, such as computers, laptops, personal digital assistants, and the like, to input characters and numerals. A keyboard may include a key cap, a base plate, and a scissor-type key cap support in which, for instance, one end of the scissor-type key cap support is pivotally connected to a pivoting support disposed at one of corners of the key cap, and the other end of the scissor-type key cap support is movably connected to the base plate, thereby allowing the scissor-type key cap support to vertically move along with the key cap.

BRIEF DESCRIPTION OF THE DRAWINGS

Examples are described in the following detailed description and in reference to the drawings, in which.

DETAILED DESCRIPTION

Keyboard devices may include a key cap, a base plate, and a key cap support (e.g., a scissor-type key cap support) in which, for instance, one end of the key cap support may be pivotally connected to a pivoting support disposed on the key cap, and the other end of the key cap support may be movably connected to the base plate via fixing structures and constraining structures, thereby allowing the key cap support to vertically move along with the key cap. In this example, the base plate of the keyboard devices may be fabricated by processing a metal plate to form the fixing structures and the constraining structures.

For example, the metal plate may be punched and bent several times (e.g., 6-8 times), so as to form the fixing structures and the constraining structures. The material of the fixing structures and the constraining structures may be same as the material of the metal plate. Thus, performing the processes several times may result in increased production costs. In addition, the metal plate may break after being bent several times, resulting in a poor yield rate of the base plate and thereby increasing the costs for fabricating the base plate. Also, processing the metal plate to form the fixing structures and the constraining structures may limit the selection of the base plate material.

Further, the key cap support may be connected between the key cap and the base plate, and may include an outer frame (e.g., a first holder) and an inner frame (e.g., a second holder). The inner frame may be pivotally connected to the outer frame by means of a rotating shaft of the inner frame. The outer frame and the inner frame may be capable of pivoting relative to each other. Further, an elastic push switch may be disposed between the key cap and the base plate.

When the key cap is pressed, the outer frame and the inner frame may change from a retractable status to a superimposed status. The key cap that moves downwards extrudes the push switch, such that the abutting section of the push switch abuts against and triggers a corresponding thin-film switch, so as to enable the keyboard device to generate a corresponding button signal. When the key cap is released, the key cap may move upwards relative to the base plate under the action of an elastic force of the push switch. In this case, the outer frame and the inner frame may change from the superimposed status to the retractable status, and the key cap may recover to the original position.

In this case, a fixing structure (e.g., a hook) may be designed to fix the outer frame to the base plate (i.e., the metal plate). Further, a gap between the fixing structure and a shaft portion of the outer frame may be provided for smooth movement and rotation of the shaft portion relative to the fixing structure, and for providing manufacturing tolerance. However, the gap between the fixing structure and the shaft portion may cause a rattling noise during acoustic vibration from the speakers, a wobbling of the key cap during tapping on the key cap surface, a typing noise, and/or the like.

Examples described herein may provide a keyboard device including a base plate and a pivoting support fixedly disposed on the base plate. For example, the pivoting support and the base plate may be integrally formed via insert molding. Further, the keyboard device may include a key cap support having a shaft portion rotatably connected to the pivoting support via a rolling element (e.g., a ball-shaped feature or a roller-shaped feature). In this case, the rolling element may be disposed between the shaft portion and the pivoting support. Furthermore, the keyboard device may include a key cap assembled to the key cap support. Examples described herein may place the rolling elements to reduce the gap between the shaft portion and the pivoting support with a low interference. Placing the rolling elements between the shaft portion and the pivoting support may eliminate the rattling noise during acoustic vibration from the speakers, provide an enhanced wobble performance during finger tapping on the keycap surface, and/or reduce typing noise.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described may be included in at least that one example, but not necessarily in other examples.

Figure 1:
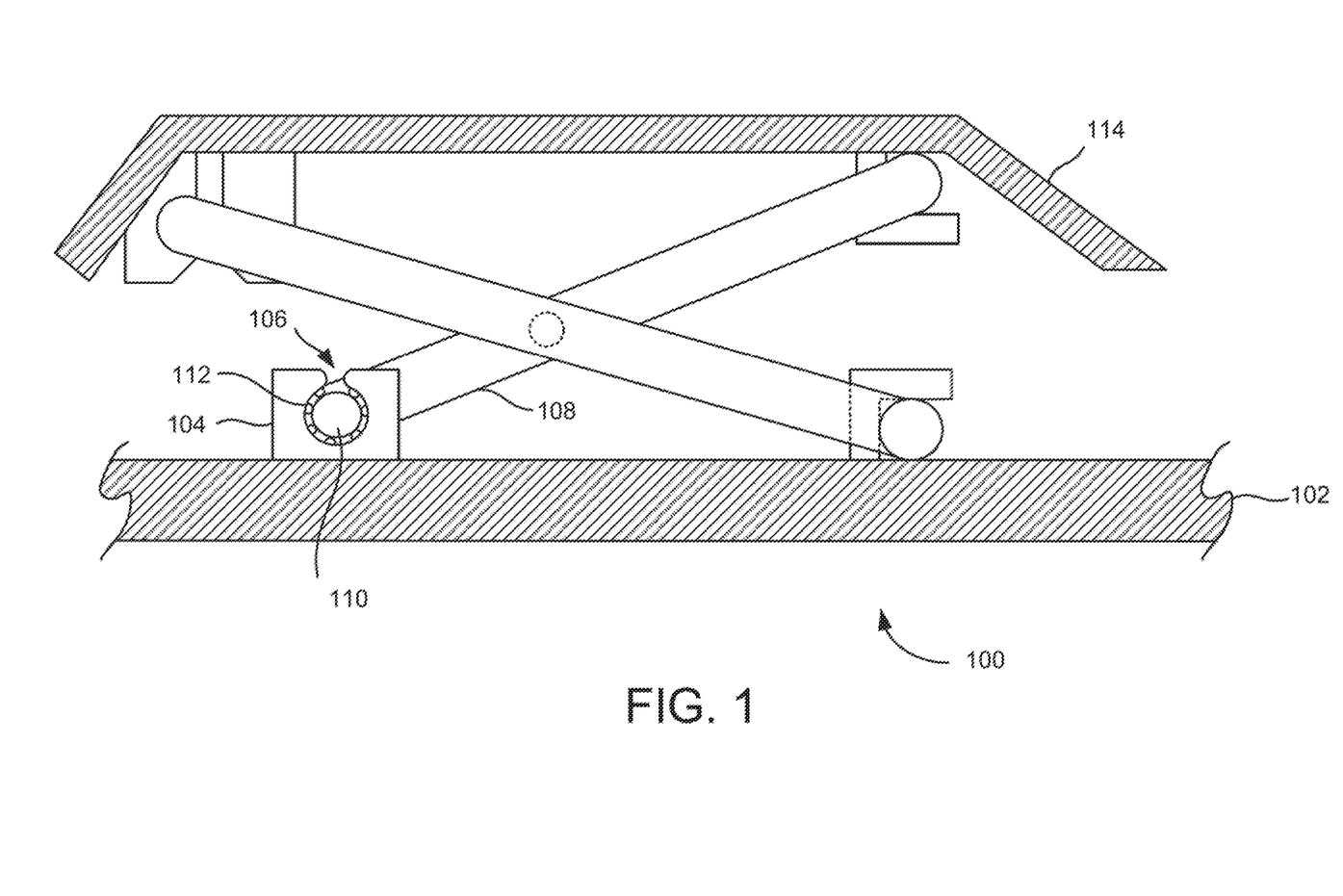
FIG. 1 depicts a side view of a portion of an example keyboard device, depicting a rolling element between a shaft portion and a pivoting support.

Referring now to the figures, FIG. 1 depicts a side view of a portion of an example keyboard device 100, depicting a rolling element 112 between a shaft portion 110 and a pivoting support 104. Keyboard device 100 may include a base plate 102. Example base plate 102 may include a metallic material. Further, keyboard device 100 may include a pivoting support 104 fixedly disposed on base plate 102 and having a recess portion 106. In one example, pivoting support 104 may include material different from material of base plate 102.

Further, keyboard device 100 may include a key cap support 108 having a shaft portion 110 rotatably received in recess portion 106. Furthermore, keyboard device 100 may include a rolling element 112 disposed between shaft Portion 110 and pivoting support 104. Example rolling element 112 may include a ball-shaped element or a roller-shaped element. In addition, keyboard device 100 may include a key cap 114 assembled to key cap support 108. Key cap 114 may move vertically relative to base plate 102 via key cap support 108. For example, key cap support 108 may be elevatably connected to base plate 102 and key cap 114 so as to guide key cap 114 to move vertically.

Figure 2A:
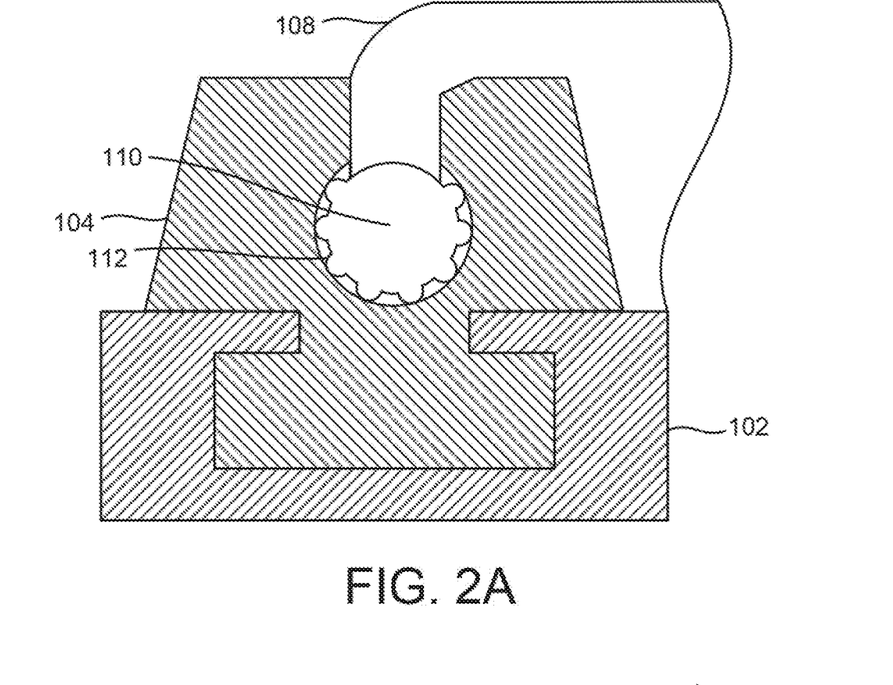
FIG. 2A depicts a cross-sectional side view of the example pivoting support of FIG. 1, depicting the rolling element disposed on the shaft portion.

FIG. 2A depicts a cross-sectional side view of example pivoting support 104 of FIG. 1, depicting rolling element 112 disposed on shaft portion 110. For example, similarly named elements of FIG. 2A may be similar in structure and/or function to elements described with respect to FIG. 1. In one example, shaft portion 110, rolling element 112, and pivoting support 104 may operate in accordance with a roller bearing structure. An example roller bearing structure may include an inner race, an outer race, a set of balls disposed between the inner race and the outer race, and a retainer to retain the set of balls. In the example described in FIG. 2A, the set of balls, the retainer, and the inner race may be combined together to form shaft portion 110. Further, pivoting support 104 may act as the outer race.

As shown in FIG. 2A, rolling element 112 may be formed on an outer surface of shaft portion 110 so as to physically contact pivoting support 104. In one example, rolling element 112 may enable shaft portion 110 to freely rotate within recess portion 106. For example, rolling element 112 may be a ball-shaped element or a roller-shaped element that may protrude from the outer surface of shaft portion 110. In some examples, shaft portion 110 may include multiple rolling elements on the outer surface to support rotation of shaft portion 110.

Figure 2B:
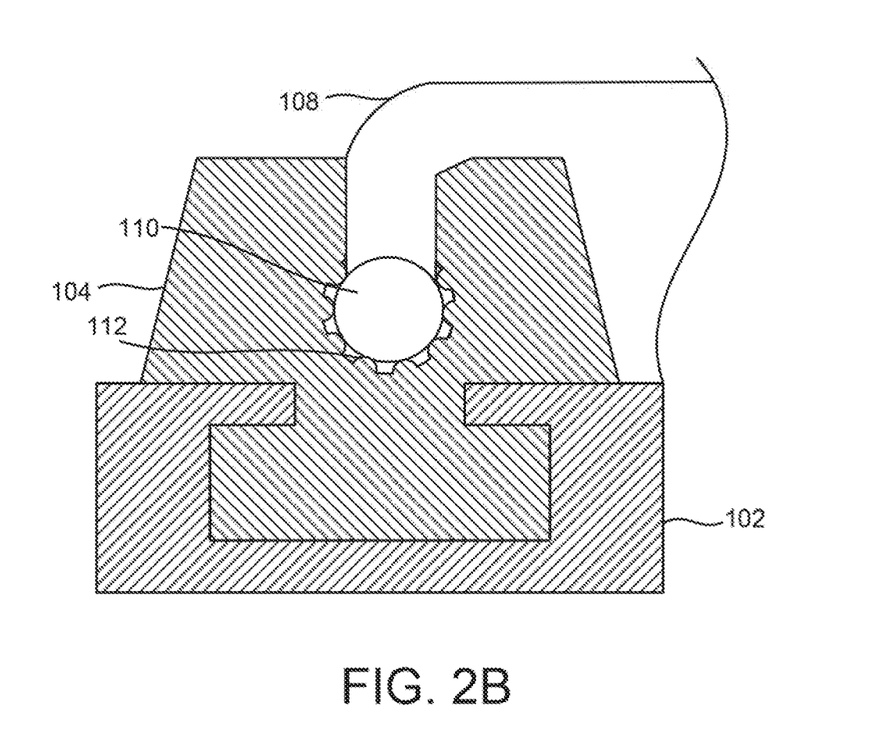
FIG. 2B depicts a cross-sectional side view of the example pivoting support of FIG. 1, depicting the rolling element disposed on the pivoting support corresponding to a recess portion.

FIG. 2B depicts a cross-sectional side view of example pivoting support 104 of FIG. 1, depicting rolling element 112 formed on pivoting support 104 corresponding to recess portion 106. For example, similarly named elements of FIG. 26 may be similar in structure and/or function to elements described with respect to FIG. 1. In the example described in FIG. 2B, the set of balls, the retainer, and the outer race may be combined together to form pivoting support 104. Further, shaft portion 110 may act as the inner race.

As shown in FIG. 2B, rolling element 112 may be formed on the surface of pivoting support 104 defining recess portion 106 so as to physically contact shaft portion 110 and enable shaft portion 110 to freely rotate within recess portion 106. For example, rolling element 112 may be a ball-shaped element or a roller-shaped element that may protrude from the surface of pivoting support 104. In some examples, pivoting support 104 may include multiple rolling elements on the surface defining recess portion 106 to support rotation of shaft portion 110.

Figure 3:
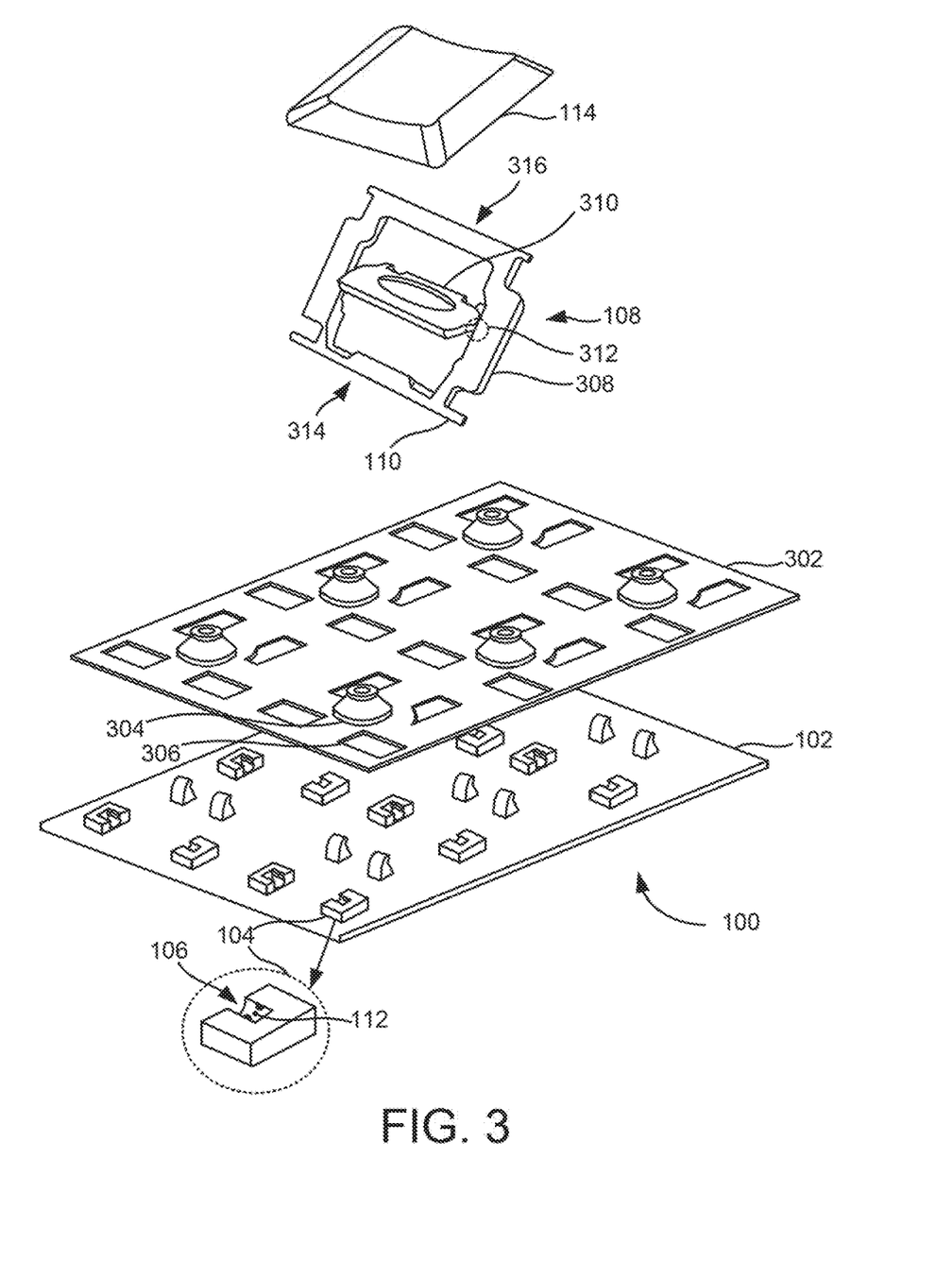
FIG. 3 is a schematic view of the example keyboard device of FIG. 1, depicting additional features.

FIG. 3 is a schematic view of example keyboard device 100 of FIG. 1, depicting additional features. For example, similarly named elements of FIG. 3 may be similar in structure and/or function to elements described with respect to FIG. 1. As shown in FIG. 3, keyboard device 100 may include a thin film circuit board 302 disposed on base plate 102 and having a push switch 304 that passes through key cap support 108 and contacts key cap 114. In one example, thin film circuit board 302 may include an opening 306 corresponding to pivoting support 104. In this example, key cap support 108 may be disposed on thin film circuit board 302 and assembled to pivoting support 104 through opening 306. In other examples, base plate 102 may be disposed on thin film circuit board 302, for instance, as described in FIG. 5.

As shown in FIG. 3, key cap support 108 may be a scissor-type key cap support. For example, key cap support 108 may include a first holder 308 and a second holder 310. First holder 308 may include a lower portion 314 and an upper portion 316. Further, second holder 310 may be pivotally assembled to first holder 308. Further, intermediate portions of first holder 308 and second holder 310 may be coupled rotatably about a pivot axis 312 to form the scissor-shape. In one example, lower portion 314 of first holder 308 may include shaft portion 110 that is rotatably received in recess portion 106 via rolling element 112. In the example shown in FIG. 3, rolling element 112 may be formed on the surface of pivoting support 104 defining recess portion 106. In another example, upper portion 316 of first holder 308 may be slidably connected to a bottom side of key cap 114. An example key cap 114 may be described in FIG. 66. When key cap 114 is pressed, push switch 304 may be pushed by key cap 114 through key cap support 108 to generate a corresponding button signal.

Figure 4:
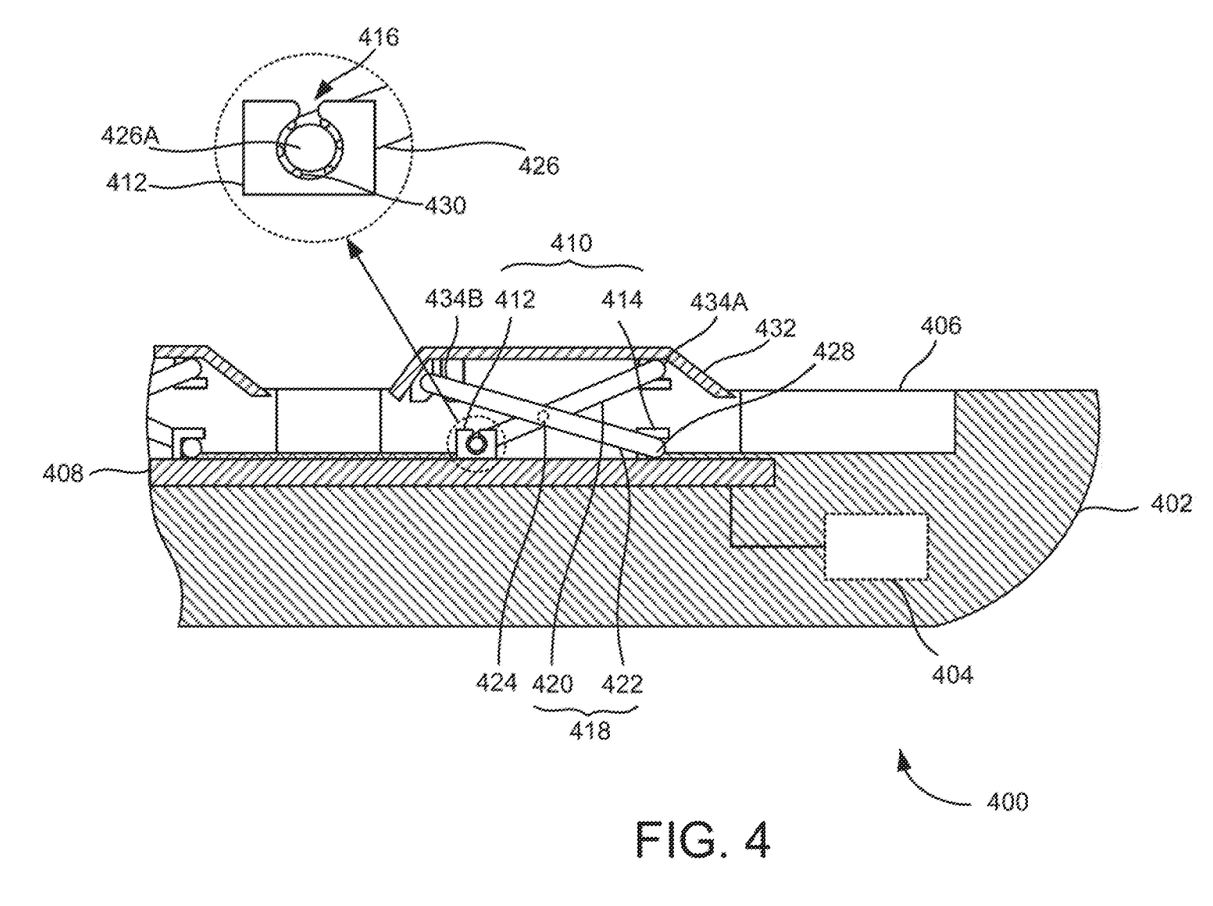
FIG. 4 depicts a cross-sectional side view of a portion of an example electronic device, depicting a key cap support pivotally connected to a first pivoting retainer via a first rolling element.

FIG. 4 depicts a cross-sectional side view of a portion of an example electronic device 400, depicting a key cap support 418 pivotally connected to a first pivoting retainer 412 via a first rolling element 430. Example electronic device 400 may be a portable computing device having a display and a keyboard assembly 406 connected to the display to input information to the portable computing device.

Electronic device 400 may include a housing 402. Housing 402 may include a processor 404 and keyboard assembly 406 connected to processor 404. Example keyboard assembly 406 may include a base plate 408 and a pivoting support 410 fixedly disposed on base plate 408. Pivoting support 410 may include first pivoting retainer 412 having a first recess portion 416. Further, pivoting support 410 may include a first slidable retainer 414 disposed opposite to first pivoting retainer 412.

Further, keyboard assembly 406 may include key cap support 418. Key cap support 418 may include first and second holders 420 and 422 having intermediate portions that are rotatably coupled about a pivot axis (e.g., 424). Further, a lower portion 426 of first holder 420 may include a first shaft portion 426A pivotally received in first recess portion 416. Furthermore, a lower portion 428 of second holder 422 may be slidably connected to first slidable retainer 414, for instance, via a sliding shaft portion provided therein.

Also, keyboard assembly 406 may include first rolling element 430, for instance, a ball-shaped element or a roller-shaped element. For example, first rolling element 430 may be formed on a surface of first shaft portion 426A or on a surface of first pivoting retainer 412 such that first rolling element 430 is to physically contact first pivoting retainer 412 or first shaft portion 426A, respectively. In one example, first shaft portion 426A may be pivotally received in first recess portion 416 via first rolling element 430. Further, keyboard assembly 406 may include a key cap 432 assembled to upper portions 434A and 4348 of first and second holders 420 and 422, respectively.

Figure 5:
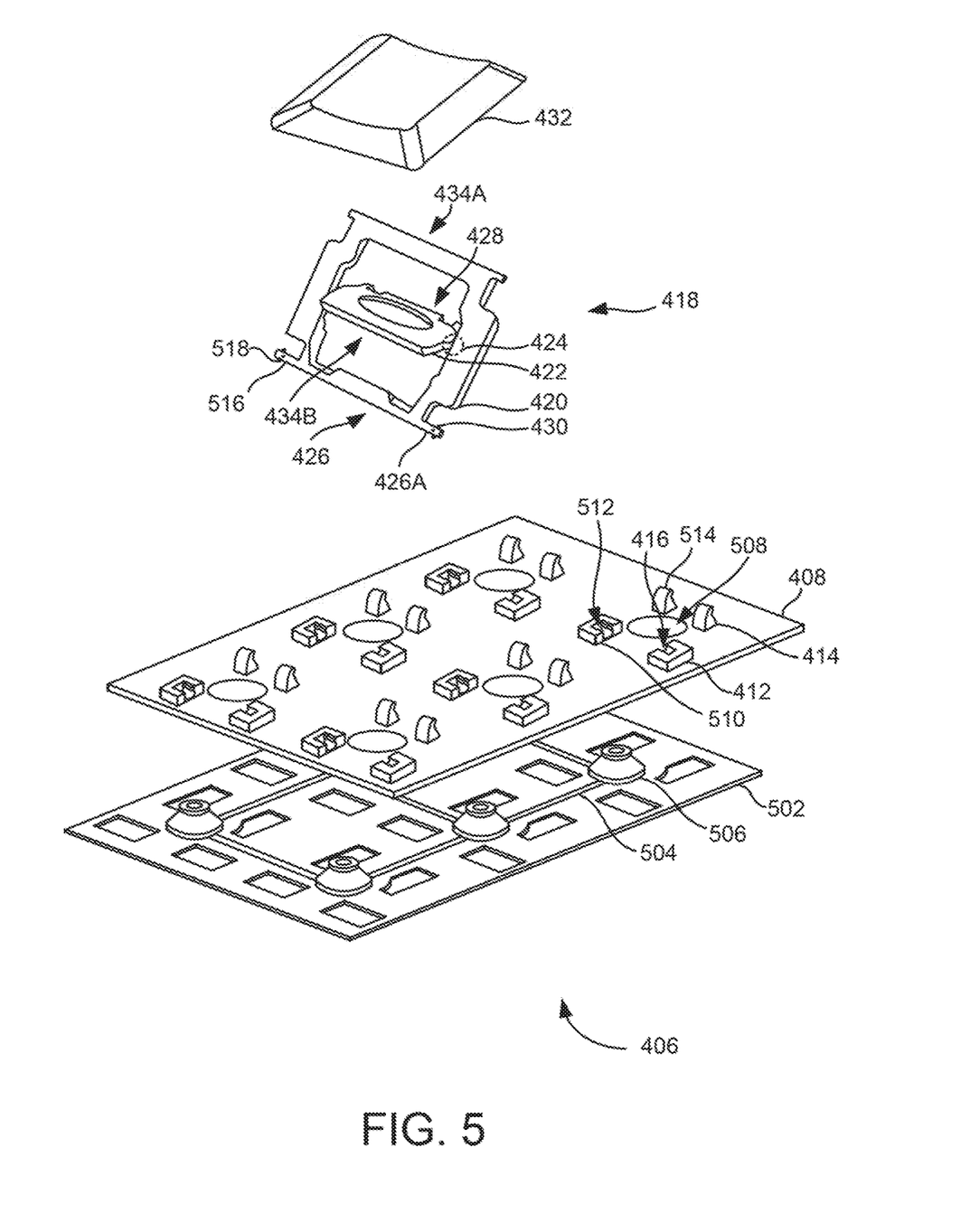
FIG. 5 is a schematic view of an example keyboard assembly of FIG. 4, depicting additional features.

FIG. 5 is a schematic view of example keyboard assembly 406 of FIG. 4, depicting additional features. For example, similarly named elements of FIG. 5 may be similar in structure and/or function to elements described with respect to FIG. 4. In the example shown in FIG. 5, keyboard assembly 406 may include a thin film circuit board 502 having an electrical contact 504. Further, keyboard assembly 406 may include a push switch 506 disposed on thin film circuit board 502. In the example shown in FIG. 5, base plate 408 may be disposed on thin film circuit board 502 and having an opening 508 corresponding to push switch 506 such that push switch 506 passes through opening 508 and key cap support 418 and contacts key cap 432. In other examples, thin film circuit board 502 may be disposed on base plate 408 as shown in FIG. 3.

Further as shown in FIG. 5, pivoting support 410 (e.g., as shown in FIG. 4) may include a second pivoting retainer 510 having a second recess portion 512. Also, pivoting support 410 may include a second slidable retainer 514 disposed opposite to second pivoting retainer 510. In this example, lower portion 426 of first holder 420 may include a second shaft portion 516 pivotally received in second recess portion 512 via a second rolling element 518 disposed therebetween. In the example shown in FIG. 5, first rolling element 430 and second rolling element 518 may be formed on a surface of first shaft portion 426A and a surface of second shaft portion 516 such that first rolling element 430 and second rolling element 518 are to physically contact first pivoting retainer 412 and second pivoting retainer 510, respectively. Second shaft portion 516 may be opposite to first shaft portion 426A at lower portion 426. Further, lower portion 428 of second holder 422 may be slidably connected to second slidable retainer 514, for instance, via sliding shafts provided therein. For example, each of first slidable retainer 414 and second slidable retainer 514 may be a hook-shaped structure.

As shown in FIG. 5, pivoting support 410 may include a pair of pivoting retainers 412 and 510 and a pair of slidable retainers 414 and 514. In this example, key cap support 418 may be assembled to pivoting retainers 412 and 510 and corresponding slidable retainers 414 and 514. For example, lower portion 426 of first holder 420 may be assembled to pivoting retainers 412 and 510. Further, lower portion 428 of second holder 422 may be constrained by slidable retainers 414 and 514. Thus, lower portion 428 of second holder 422 can move horizontally, but not vertically. Upper portions 434A and 4346 of corresponding first holder 420 and second holder 422 that are not assembled to pivoting retainers 412 and 510 and slidable retainers 414 and 514, respectfully, may be assembled to key cap 432. In some examples, thin film circuit board 502 may include multiple push switches, and the button assemblies (i.e., key cap supports and key caps) may be disposed on a corresponding one of the multiple push switches. Also, base plate 408 may include multiple openings corresponding to multiple push switches, such that the push switches can pass through a corresponding opening and contact a corresponding key cap.

Figure 6A:
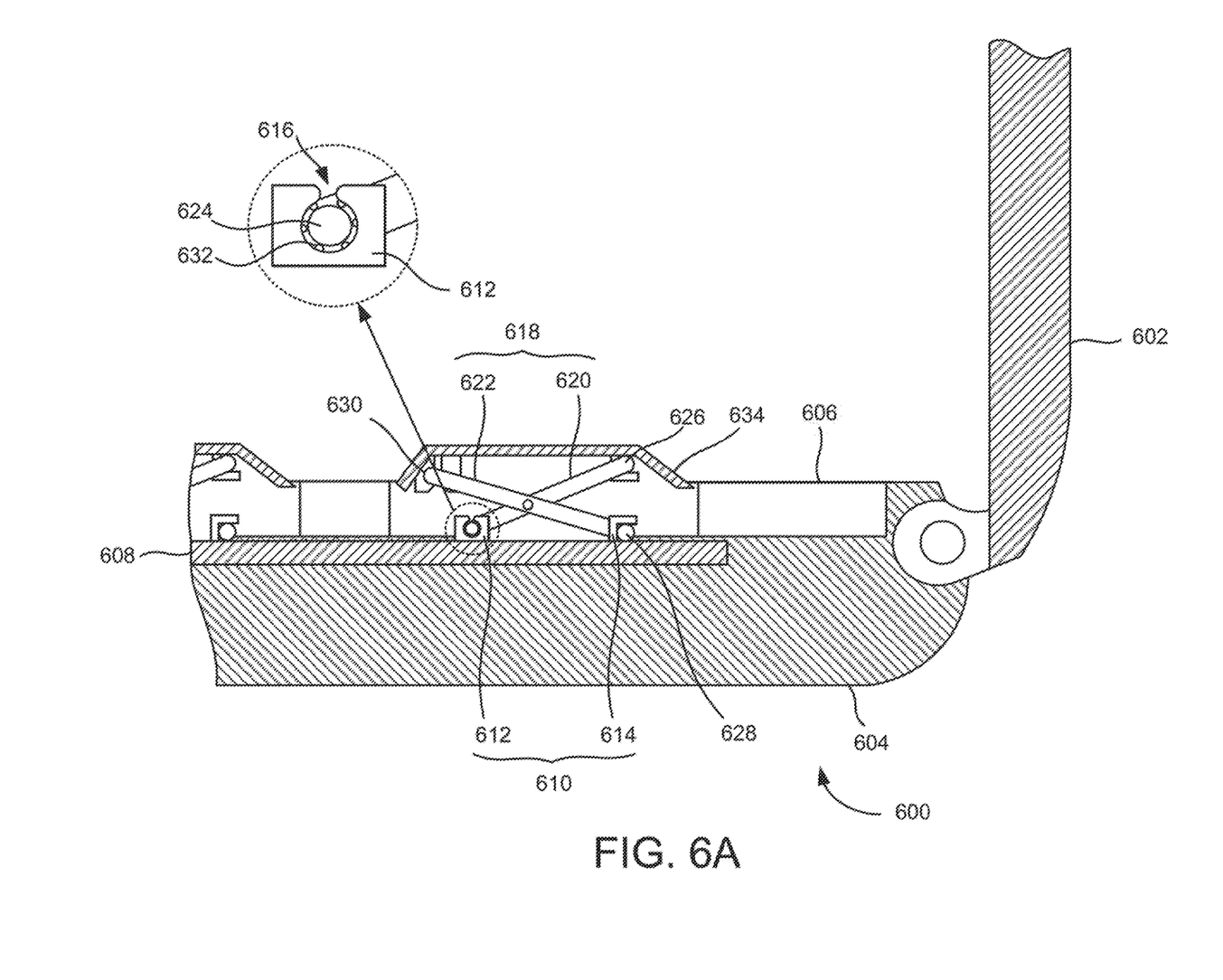
FIG. 6A depicts a cross-sectional side view of a portion of an example electronic device, depicting a pivoting support integrally formed on a base plate via insert molding.
Figure 6B:
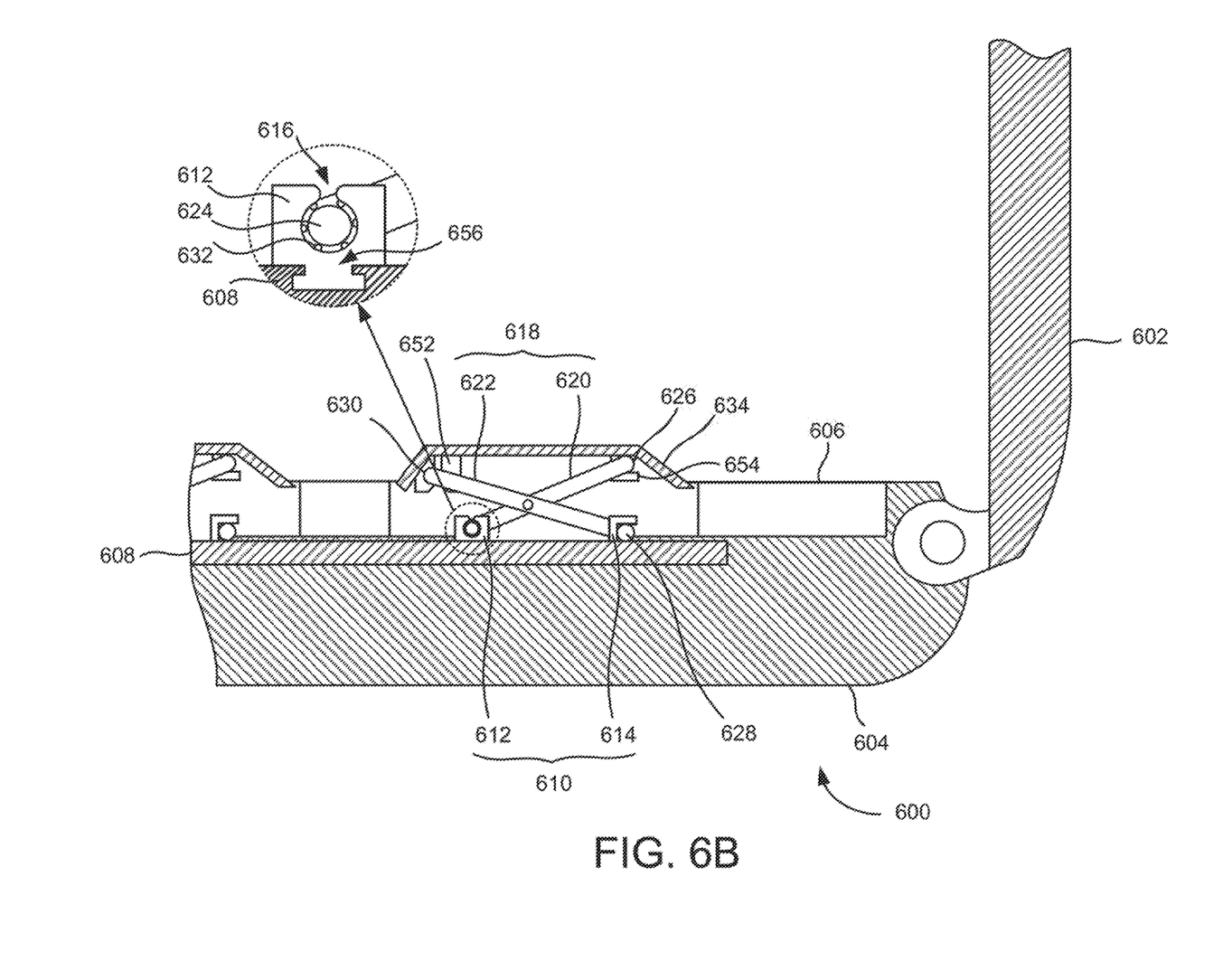
FIG. 6B depicts a cross-sectional side view of the portion of the example electronic device of FIG. 6A, depicting additional features.

FIG. 6A depicts a cross-sectional side view of a portion of an example electronic device 600, depicting pivoting support 610 integrally formed on base plate 608 via insert molding, Example electronic device may include, but not limited to, a laptop, a convertible device, a personal digital assistance (PDA), a notebook, a sub-notebook, a personal gaming device, a mobile phone, or any other device that may include a keyboard assembly. Example convertible device may refer to a device that can be "converted" from a laptop mode to a tablet mode.

Example electronic device 600 may include a display portion 602 and a base portion 604 coupled to display portion 602, For example, a hinge assembly may pivotally, twistably, or detachably couple display portion 602 and base portion 604. In other examples, display portion 602 and base portion 604 can be implemented in a single housing. Further, a motherboard and electronic components such as a hard disk, memory, peripheral ports, a battery, and the like may be assembled in base portion 604 to control the operation of electronic device 600, and an input apparatus, such as a keyboard and touchpad, may be positioned on a surface of base portion 604. Display portion 602 may include a display unit (e.g., a touch-screen display).

Example display unit may include liquid crystal display (LCD), light emitting diode (LED) display, electro-luminescent (EL) display, or the like. Also, electronic device 600 may be equipped with other components such as a camera, an audio/video device, or the like depending on the functions of electronic device 600. In some examples, electronic device 600 can be implemented without some of the components such as the touchpad.

In one example, base portion 604 may include keyboard assembly 606. Further, keyboard assembly 606 may include base plate 608 and pivoting support 610 integrally formed on base plate 608 via insert molding. For example, base plate 608 may include metal and pivoting support 610 may include plastic. An example insert molding process to integrally form base plate 608 and pivoting support 610 is explained with respect to FIG. 6B.

Further, pivoting support 610 may include a first pivoting retainer 612 having a recess portion 616. Further, pivoting support 610 may include a first slidable retainer 614 disposed opposite to first pivoting retainer 612. Also, pivoting support 610 may include a key cap support 618.

In one example, key cap support 618 may include a first holder 620 having a first end portion 624 and a second end portion 626. Further, key cap support 618 may include a second holder 622 having a third end portion 628 and a fourth end portion 630. First end portion 624 may pivotally receive in recess portion 616 and third end portion 628 may slidably connect to first slidable retainer 614.

Furthermore, keyboard assembly 606 may include a rolling element 632. In one example, first end portion 624 may pivotally receive in recess portion 616 via rolling element 632. Example rolling element 632 may include a ball-shaped element or a roller-shaped element disposed between first end portion 624 and first pivoting retainer 612. In addition, keyboard assembly 606 may include a key cap 634 assembled to key cap support 618. An example key cap structure is explained in FIG. 68.

FIG. 68 depicts a cross-sectional side view of the portion of example electronic device 600 of FIG. SA, depicting additional features. For example, similarly named elements of FIG. 6B may be similar in structure and/or function to elements described with respect to FIG. 6A. As shown in FIG. 6B, key cap 634 may include a second pivoting retainer 652 to pivotally receive fourth end portion 630 and a second slidable retainer 654 to slidably connect to second end portion 626. In some examples, key cap 634 may include a pair of pivoting retainers and a pair of slidable retainers to connect to fourth end portion 630 and second end portion 626, respectively, such that one side of both first holder 620 and second holder 622 may be in sliding motion, and other end of both first holder 620 and second holder 622 may be in axial rotating motion to enable vertical movement of key cap 634. The pair of pivoting retainers and the pair of slidable retainers may be oppositely disposed on a bottom surface of key cap 634 and may be adjacent to two opposite sides of the bottom surface of key cap 634, respectively. First holder 620 and second holder 622 can include any structure that can fit a pair of pivoting retainers and a pair of slidable retainers disposed on base plate 608.

Further, an example insert molding process to integrally form base plate 608 and pivoting support 610 may include:
a. Providing and processing a metal plate/base plate 608. In this example, metal plate 608 may be processed to punch metal plate 608, so as to form a recess feature 656 on a surface of metal plate 608.
b. Perform an insert molding process on metal plate 608 to form pivoting support 610. A material of pivoting support 610 is different from the material of metal plate 608. In this example, the punched metal plate 608 may be placed in a mold. Further, a plastic molding material may be filled into the mold through recess feature 656 and then cured to form pivoting support 610 on metal plate 608. The shape of recess feature 656 can be designed such that pivoting support 610 formed by curing the plastic molding material may be shaped like "I" and hence pivoting support 610 can be securely fixed on metal plate 608.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A keyboard device comprising:
a base plate;
a pivoting support fixedly disposed on the base plate and having a recess portion;
a key cap support having a shaft portion rotatably received in the recess portion;
a rolling element disposed between the shaft portion and the pivoting support, wherein the pivoting support, the shaft portion, and the rolling element operate as a roller bearing structure that includes an inner race, an outer race, the rolling element disposed between the inner race and the outer race, and a retainer to retain the rolling element, and wherein the rolling element, the retainer, and the inner race are combined to form the shaft portion and the pivoting support acts as the outer race; and
a key cap assembled to the key cap support.

2. The keyboard device of claim 1, wherein the rolling element is a set of ball shaped elements.

3. The keyboard device of claim 1, wherein the key cap support is a scissor-type key cap support.

4. The keyboard device of claim 1, further comprising:
a thin film circuit board disposed on the base plate and having a push switch that passes through the key cap support and contacts the key cap, wherein the thin film circuit board comprises an opening corresponding to the pivoting support, and wherein the key cap support is disposed on the thin film circuit board and assembled to the pivoting support through the opening.

5. The keyboard device of claim 1, wherein the key cap support comprises:
first and second holders with upper and lower portions, and intermediate portions that are coupled rotatably about a pivot axis, wherein the lower portion of the first holder comprises the shaft portion that is rotatably received in the recess portion, and wherein the upper portion of the first holder is slidably connected to a bottom side of the key cap.

6. An electronic device comprising:
a housing comprising:
a processor; and
a keyboard assembly connected to the processor, the keyboard assembly comprising:
a base plate;
a pivoting support fixedly disposed on the base plate, the pivoting support comprising:
a first pivoting retainer having a first recess portion; and
a first slidable retainer disposed opposite to the first pivoting retainer;
a key cap support comprising:
first and second holders having intermediate portions that are rotatably coupled, wherein a lower portion of the first holder comprises a first shaft portion pivotally received in the first recess portion, and wherein a lower portion of the second holder is slidably connected to the first slidable retainer;
a first rolling element, wherein the first shaft portion is pivotally received in the first recess portion via the first rolling element;
wherein the pivoting support, the first shaft portion, and the first rolling element operate as a roller bearing structure that includes an inner race, an outer race, the first rolling element disposed between the inner race and the outer race, and a bearing retainer to retain the first rolling element, and wherein the first rolling element, the bearing retainer, and the outer race are combined to form the pivoting support and the first shaft portion acts as the inner race; and
a key cap assembled to upper portions of the first and second holders.

7. The electronic device of claim 6, wherein the first rolling element comprises a ball-shaped element or a roller-shaped element.

8. The electronic device of claim 6, wherein the first rolling element is defined on a surface of the first shaft portion or on a surface of the first pivoting retainer such that the first rolling element is to physically contact the first pivoting retainer or the first shaft portion, respectively.

9. The electronic device of claim 6, further comprising:
a thin film circuit board having an electrical contact; and
a push switch disposed on the thin film circuit board, wherein the base plate is disposed on the thin film circuit board and having an opening corresponding to the push switch such that the push switch passes through the opening and the key cap support and contacts the key cap.

10. The electronic device of claim 6, wherein the pivoting support further comprises:
a second pivoting retainer having a second recess portion; and
a second slidable retainer disposed opposite to the second pivoting retainer, wherein the lower portion of the first holder comprises a second shaft portion pivotally received in the second recess portion via a second rolling element formed therebetween, and wherein the lower portion of the second holder is slidably connected to the second slidable retainer.

11. An electronic device comprising:
a display portion; and
a base portion coupled to the display portion and including a keyboard assembly, the keyboard assembly comprising:
a base plate;
a pivoting support integrally formed on the base plate via insert molding, wherein the pivoting support comprises:
a first pivoting retainer having a recess portion; and
a first slidable retainer disposed opposite to the first pivoting retainer;
a key cap support comprising:
a first holder having first and second end portions; and
a second holder having third and fourth end portions, wherein the first end portion is to pivotally receive in the recess portion and the third end portion is to slidably connect to the first slidable retainer;
a rolling element, wherein the first end portion is to pivotally receive in the recess portion via the rolling element, and wherein the pivoting support, the first end portion, and the rolling element operate as a roller bearing structure that includes an inner race, an outer race, the rolling element disposed between the inner race and the outer race, and a bearing retainer to retain the rolling element, and wherein the rolling element, the bearing retainer, and the outer race are combined to form the pivoting support and the first end portion acts as the inner race; and
a key cap assembled to the key cap support.

12. The electronic device of claim 11, wherein the rolling element comprises a ball-shaped element or a roller-shaped element formed between the first end portion and the first pivoting retainer.

13. The electronic device of claim 11, wherein the rolling element is disposed on an outer surface of the first end portion or on a surface defining the recess portion such that the rolling element is to physically contact the first pivoting retainer or the first end portion, respectively.

14. The electronic device of claim 11, wherein the key cap comprises:
a second pivoting retainer to pivotally receive the fourth end portion; and
a second slidable retainer to slidably connect to the second end portion.

15. The electronic device of claim 11, wherein the base plate comprises metal, and wherein the pivoting support comprises plastic.

* * * * *